United States Patent [19]
Saitoh et al.

[11] Patent Number: 6,127,039
[45] Date of Patent: Oct. 3, 2000

[54] MAGNETIC RECORDING MEDIUM AND A PROCESS FOR PRODUCING THE SAME

[75] Inventors: Akira Saitoh; Akihiko Seki; Takayoshi Kuwajima; Satoru Tsuchida, all of Saku, Japan

[73] Assignee: TDK Corporation, Tokyo, Japan

[21] Appl. No.: 09/235,382

[22] Filed: Jan. 22, 1999

[30] Foreign Application Priority Data

Jan. 23, 1998 [JP] Japan .................................. 10-026752

[51] Int. Cl.$^7$ .................................................. G11B 05/738
[52] U.S. Cl. ............... 428/425.9; 428/522; 428/694 BU; 428/694 BC; 428/694 BG; 428/694 BB; 428/900
[58] Field of Search .................................. 428/425.9, 522, 428/694 BU, 694 BC, 694 BG, 900, 694 BB

[56] References Cited

U.S. PATENT DOCUMENTS

| | | | |
|---|---|---|---|
| 5,443,913 | 8/1995 | Kohno et al. | 428/425.9 |
| 5,576,075 | 11/1996 | Kawasaki et al. | 427/565 |
| 5,698,286 | 12/1997 | Ikarashi et al. | 428/65.3 |
| 5,712,028 | 1/1998 | Seki et al. | 428/216 |

FOREIGN PATENT DOCUMENTS

| | | |
|---|---|---|
| 59-207027 | 11/1984 | Japan . |
| 60-38723 | 2/1985 | Japan . |
| 4-167225 | 6/1992 | Japan . |
| 6-131652 | 5/1994 | Japan . |
| 8-241515 | 9/1996 | Japan . |

*Primary Examiner*—Stevan A. Resan
*Attorney, Agent, or Firm*—Oblon, Spivak, McClelland, Maier & Neustadt, P.C.

[57] ABSTRACT

A magnetic recording medium comprising a non-magnetic base having on at least one side a non-magnetic layer (undercoat) containing electron beam-curable resins which in turn is over-laid with a magnetic layer (topcoat) containing an iron (Fe) based magnetic powder, said magnetic layer having a glass transition temperature (Tg) of at least 65° C. and said non-magnetic layer being an electron beam cured coating that is formed by coating the non-magnetic base with a non-magnetic coating mix containing electron beam curable resins, the yet to be cured coating having a glass transition temperature (Tg) of 30–53° C. and said electron beam curable resins comprising an electron beam curable vinyl chloride based resin having a sulfur-containing polar group and an electron beam curable urethane resin having a phosphorus-containing polar group. Also disclosed is a process for producing the magnetic recording medium, which has good electromagnetic conversion characteristics in a high-frequency range and which can be manufactured at high production rate.

7 Claims, No Drawings

MAGNETIC RECORDING MEDIUM AND A PROCESS FOR PRODUCING THE SAME

BACKGROUND OF THE INVENTION

1. Field of the Invention

This invention relates to a magnetic recording medium and a process for producing the same. More specifically, the invention relates to a coated magnetic recording medium that is capable of efficient electromagnetic conversion characteristics in a high-frequency range and which can be manufactured at high production rate. The invention also relates to a process for producing such magnetic recording medium.

2. Description of Related Art

With the recent spread of large-capacity storage devices, a demand has arisen for increasing the density of magnetic recording media and to meet this need, more highly filled-up, thinner and smoother magnetic layers are required. However, the efforts to increase the filling up of the magnetic layer and smoothen its surface are compromised by the deterioration of the physical properties of the magnetic recording medium as the final product. A common practice in dealing with this problem is preventing it by providing a separate non-magnetic layer under the magnetic layer.

While several methods have been proposed to date, Unexamined Published Japanese Patent Application (kokai) No. 207027/1984 teaches the use of a radiation-cured undercoat containing a radiation-curable resin and a filler with a view to preventing the sticking of adjacent layers while increasing the filling-up and wear resistance of the magnetic layer and improving the surface property of the resulting medium. However, the proposed undercoat is not satisfactory in terms of dispersibility and surface property and, in addition, the physical properties of the undercoat and the overlying magnetic layer do not have satisfactorily high reliability in varying environments ranging from high to low temperatures.

Unexamined Published Japanese Patent Application (kokai) No. 167225/1992 teaches the technique of increasing the stiffness and improving the electromagnetic conversion characteristics by incorporating acicular particles with an aspect ratio of 3 or more in a binder resin in the undercoat that cures upon irradiation with electromagnetic waves such as radiations and UV rays. However, the proposed undercoat is still unsatisfactory in terms of dispersibility and surface property.

Other relevant prior art references include Unexamined Published Japanese Patent Application (kokai) Nos. 38723/1985 and 131652/1994. The former teaches the technique of producing a magnetic recording medium with small static charge buildup, high surface smoothness of the magnetic layer and high adhesive strength by using a radiation-cured undercoat that has carbon black dispersed in one or more radiation-curable oligomers or polymers that contain at least one unsaturated double bond. According to the latter reference, two electron beam (EB) curable resins having polar groups are used in a back coat. The combined use of two EB curable resins having polar groups is intended to improve the dispersibility of inorganic pigments such as carbon so that print-through to the magnetic layer is sufficient retarded to achieve better electromagnetic conversion characteristics and lower error rates. However, this reference makes no disclosure about the application of the proposed technique to the non-magnetic undercoat.

Thus, various methods have so far been proposed with a view to improving the characteristics of magnetic recording media by providing an undercoat and employing EB curable resins. However, there still remains the need to develop techniques capable of producing even better magnetic recording media in order to satisfy the recent requirement for higher density.

SUMMARY OF THE INVENTION

An object, therefore, of the present invention is to provide a magnetic recording medium that is characterized by the high dispersibility and calenderability of the non-magnetic layer (undercoat) and the high durability and good electromagnetic conversion characteristics of the magnetic layer (topcoat) in a high-frequency range, and which can be manufactured at high production rate.

The present inventors made intensive studies in order to attain the stated object. As a result, they found that the stated object could be attained by a magnetic recording medium in which the magnetic layer (topcoat) has a specified glass transition temperature (Tg), the non-magnetic layer (undercoat) contains two specified electron beam curable resins and wherein said non-magnetic layer yet to be cured with electron beams has a glass transition temperature (Tg) within a specified range. The present invention has been accomplished on the basis of this finding.

Thus, the present invention relates to a magnetic recording medium comprising a non-magnetic base having on at least one side a non-magnetic layer (undercoat) containing electron beam-curable resins which in turn is overlaid with a magnetic layer (topcoat) containing an iron (Fe) based magnetic powder, said magnetic layer having a glass transition temperature (Tg) of at least 65° C. and said non-magnetic layer being an electron beam cured coating that is formed by coating the non-magnetic base with a non-magnetic coating mix containing electron beam curable resins, the yet to be cured coating having a glass transition temperature (Tg) of 30–53° C. and said electron beam curable resins comprising an electron beam curable vinyl chloride based resin having a sulfur-containing polar group and an electron beam curable urethane resin having a phosphorus-containing polar group.

The present invention also relates to a process for producing said magnetic recording medium comprising the steps of:

(I) coating at least one side of a non-magnetic base with a non-magnetic coating mix containing electron beam curable resins to form a coating;

(II) curing said coating with electron beams to form a non-magnetic layer; and (III) coating said non-magnetic layer with a magnetic coating mix containing an iron (Fe) based magnetic powder to form a magnetic layer.

In step (II), the coating is preferably calendered before curing.

In another preferred embodiment, the process includes step (IV) of forming a backcoating.

DETAILED DESCRIPTION OF THE INVENTION

The magnetic recording medium of the present invention comprises a non-magnetic base having on at least one side a non-magnetic layer (undercoat) containing electron beam curable resins which in turn is overlaid with a magnetic layer (topcoat) containing an iron (Fe) based magnetic powder.

The electron beam curable resins to be contained in the non-magnetic layer (undercoat) comprise an electron beam curable vinyl chloride based resin having a sulfur-containing polar group and an electron beam curable urethane resin having a phosphorus-containing polar group.

The sulfur-containing polar group ("S-containing polar group") to be contained in the electron beam curable vinyl chloride based resin is desirably a sulfuric acid group and/or a sulfo group.

If the sulfuric acid group and the sulfo group are respectively represented by —$SO_4Y$ and —$SO_3Y$ (Y is H or an alkali metal), —$SO_4K$ and —$SO_3K$ (Y is specifically potassium) are particularly desirable. Either the sulfuric acid group or the sulfo group or both may be contained; if both groups are to be contained, their proportions may take any desired values.

The above-described S-containing polar groups are preferably contained in the molecule in an amount of 0.01–10 wt %, more preferably 0.1–5 wt %, as calculated for S atom.

The skeletal resin to which these S-containing polar groups are to be bonded is a vinyl chloride based resin. Preferred vinyl chloride based resins are those which have a vinyl chloride content of 60–100 wt %, with the range of 60–95 wt % being particularly preferred.

Examples of the preferred vinyl chloride based resins include a vinyl chloride-vinyl acetate-vinyl alcohol copolymer, a vinyl chloride-vinyl alcohol copolymer, a vinyl chloride-hydroxyalkyl (meth)acrylate copolymer and a vinyl chloride-vinyl acetate-vinyl alcohol-glycidyl (meth)acrylate copolymer. Particularly preferred are copolymers of vinyl chloride and epoxy group containing monomers. The preferred range for the average degree of polymerization of the vinyl chloride based resins is from about 100 to about 900.

The vinyl chloride based resin contains an unsaturated double bond in addition to the S-containing polar group and preferred examples of the unsaturated double bond are an acrylic group ($CH_2$=CH—COO—) and a methacrylic group ($CH_2$=$CHCH_3$COO—). The number of the (meth)acrylic groups to be contained in the molecule ranges preferably from 1 to 20, more preferably from about 2 to about 10, on the average. The (meth)acrylic group is preferably bonded to the skeletal vinyl chloride based resin via a single urethane bond.

The preferred method of preparing the electron beam curable vinyl chloride based resin having a S-containing polar group proceeds as follows.

The first step is providing a feed vinyl chloride based resin containing not only a S-containing polar group but also a hydroxyl group. The feed vinyl chloride based resin contains 3–60, preferably 2–30, hydroxyl groups in one molecule. In addition to the S-containing polar group, other polar groups may optionally be contained, as exemplified by —$OPO_3Y$, —$PO_3Y$, —COOY (Y is H or an alkali metal), an amino group (—$NR_3$) and —$NR_3Cl$ (R is H, methyl or ethyl). Among these, an amino group is preferred, with a dialkylamino group (preferably an alkyl of 1–10 carbon atoms) being particularly preferred. Such amino groups can usually be obtained by modification with amines. To this end, a copolymer of vinyl chloride and a vinyl ester of an alkylcarboxylic acid is dispersed or dissolved in an organic solvent such as alcohol; to the dispersion or solution, an amine compound (as selected from among primary, secondary and tertiary amines such as aliphatic amines, alicyclic amines, alkanolamines and alkoxyalkylamines) and an epoxy group containing compound are added to initiate a saponification reaction. The epoxy group containing compound is added in order to increase the reaction rate of saponification. If a vinyl unit containing such amino groups is to be contained, it is preferably incorporated in the resin in an amount of about 0.05–5 wt %. The amino group may eventually be present in the form of an ammonium salt as the result of the saponification reaction.

Advantageous examples of the feed vinyl chloride based resin are disclosed in Unexamined Published Japanese Patent Application (kokai) Nos. 238371/1985, 101161/1985, 235814/1985, 238306/1985, 238309/1985 and so forth.

The feed vinyl chloride based resin can be prepared by polymerizing vinyl chloride, an epoxy group containing monomer and, optionally, other copolymerizable monomers in the presence of a radical generator having a S-containing strong acid group as exemplified by ammonium persulfate or potassium persulfate. The radical generator is usually added in an amount of 0.3–9.0 wt %, preferably 1.0–5.0 wt %, of the monomers.

Since most radical generators having a S-containing sulfate group are water-soluble, polymerization is advantageously performed by emulsion polymerization, suspension polymerization using an alcohol like methanol as a polymerization medium or solution polymerization using ketones as a solvent.

In addition to the radical generator having a S-containing sulfate group, a radical generators commonly employed in the polymerization of vinyl chloride may also be used. Examples of such optional radical generators include the following: organic peroxides such as lauryl peroxide, benzoyl peroxide, 3,5,5-trimethylhexanoyl peroxide, diisopropyl peroxydicarbonate, di-2-ethylhexyl peroxydicarbonate, di-2-ethoxyethyl peroxydicarbonate, t-butyl-peroxypivalate, and t-butyl-peroxyneodecanoate; and azo compounds such as 2,2'-azobisisobutyronitrile, 2,2'-azobis-2,4-dimethylvaleronitrile and 4,4'-azobis-4-cyanovaleric acid. If desired, the radical generator having a strong acid group may be used in combination with a reducing agent such as sodium sulfoxylate formaldehyde, sodium sulfite or sodium thiosulfate.

A suspension stabilizer may be used in the polymerization reaction and examples include the following: polyvinyl alcohol; partially saponified polyvinyl acetate; cellulose derivatives such as methyl cellulose, hydroxypropyl cellulose and carboxymethyl cellulose; synthetic polymeric substances such as polyvinylpyrrolidone, polyacrylamide, a maleic acid-styrene copolymer, a maleic acid-methyl vinyl ether copolymer and a maleic acid-vinyl acetate copolymer; and natural polymeric substances such as starch gelatin.

If an emulsifier is to be used, suitable examples include anionic emulsifiers such as sodium alkylbenzenesulfonates and sodium lauryl sulfate and nonionic emulsifiers such as polyoxyethylene alkyl ethers and partially esterified polyoxyethylene sorbitan aliphatic acids.

If necessary, a molecular weight regulator such as trichloroethylene or thioglycol may be used.

Examples of the epoxy group containing monomers include the following: glycidyl ethers of unsaturated alcohols such as allyl glycidyl ether and methacryl glycidyl ether; glycidyl esters of unsaturated acids such as glycidyl acrylate, glycidyl methacrylate, glycidyl-P-vinyl benzoate; methyl glycidyl itaconate, glycidyl ethyl malate, glycidyl vinyl sulfonate and glycidyl (meth)allyl sulfonate; and epoxide olefins such as butadiene monoxide, vinyl cyclohexene monooxide and 2-methyl-5,6-epoxyhexene. The epoxy group containing monomer is generally used in such an amount that the content of epoxy groups in the copolymer is at least 0.5 wt %.

Monomers that may optionally be used in addition to vinyl chloride and the epoxy group containing monomer include the following: vinyl esters of carboxylic acids such as vinyl acetate and vinyl propionate; vinyl ethers such as methyl vinyl ether, isobutyl vinyl ether and cetyl vinyl ether; vinylidenes such as vinylidene chloride and vinylidene fluoride; unsaturated carboxylic acid esters such as diethyl maleate, butylbenzyl maleate, di-2-hydroxyethyl maleate, dimethyl itaconate, methyl (meth)acrylate, ethyl (meth) acrylate, lauryl (meth)acrylate, and 2-hydroxypropyl (meth) acrylate; olefins such as ethylene and propylene; unsaturated nitriles such as (meth)acrylonitrile; and aromatic vinyl compounds such as styrene, α-methylstyrene and P-methylstyrene.

The thus prepared feed vinyl chloride based resin has preferably an average degree of polymerization in the range of 100–900, more preferably 200–500, and a vinyl chloride content of at least 60 wt %. Such feed vinyl chloride based resin is commercially available under various trade names such as "MR-110" (Nippon Zeon Co., Ltd.)

The feed vinyl chloride based resin is subsequently modified to an electron radiation curing resin by exposure to electron beams.

Two well known methods for rendering thermosetting vinyl chloride based resins to be curable with electron beams are the following: the ester modification of a resin having a hydroxyl group or a carboxylic acid group by reacting it with a compound having a (meth)acryl group and a carboxylic anhydride or a dicarboxylic acid; the urethane modification of the resin by reaction with the reaction product (adduct) of tolylene diisocyanate (TDI) and 2-hydroxyethyl (meth) acrylate (2-HEMA).

The first method (ester modification) usually produces brittle coatings and hence is not preferred if the vinyl chloride based resin is to be treated. The commonly used adduct of isocyanate and acrylate (TDI/2-HEMA) already has a urethane bond, so two urethane bonds will occur in a branched molecular chain having a terminal acrylic double bond. The two urethane bonds and the long chain contribute to lower the dispersibility, so the second method (urethane modification) is not suitable to a case where high dispersibility is required.

For the reasons stated above, a monomer that has at least one ethylenically unsaturated double bond and one isocyanate group in one molecule but which does not have a urethane bond in the molecule is preferably used in modifying the feed vinyl chloride based resin to become curable upon exposure to electron beams. An exemplary monomer that satisfies this requirement is 2-isocyanate ethyl (meth) acrylate. Since isocyanate ethyl acrylate does not have a urethane bond in the molecule, branched molecular chains in the modified vinyl chloride contain only one urethane bond after modification. In addition, the branched chains are not long enough to lower the dispersibility of the inherent skeletal vinyl chloride. What is more, due to the presence of urethane bonds in the backbone chain of the molecule, no brittle coatings will form at an increased proportion of the vinyl chloride based resin.

Thus, an ethylenically unsaturated double bond is introduced through the urethane bond formed by reacting the feed vinyl chloride based resin having a hydroxyl group and a S-containing polar group with a suitable monomer. The curability with electron beams can be controlled to any desired degree by adjusting the molar ratio between the feed vinyl chloride based resin and the monomer. However, as already mentioned, if the concentration of the urethane bond is unduly high, the dispersibility will decrease. To attain a good balance between dispersibility and EB curability, one molecule of the feed vinyl chloride based resin may be reacted with 1–20 monomers, preferably 2–10 monomers, thereby producing an electron beam curable vinyl chloride based resin that is improved in both dispersibility and curability.

To react the feed vinyl chloride based resin with a suitable monomer, a vinyl chloride based copolymer having a hydroxyl and other polar groups is optionally dissolved in a known inert organic solvent and subjected to reaction in the presence of a known urethane forming reaction catalyst and a known radical polymerization inhibitor such as hydroquinone at a temperature of not higher than 60° C.

It should be mentioned that the above-described electron beam curable vinyl chloride based resin having a S-containing polar group is commercially available under various trade names such as "TB-0246" (Toyobo Co., Ltd.)

An electron beam curable urethane resin having a phosphorus-containing polar group ("P-containing polar group") must be used together with the electron beam curable vinyl chloride based resin.

The P-containing polar group is preferably at least one member of the group consisting of a phosphonic acid group ($=PO_3Y$), a phosphinic acid group ($=PO_2Y$) and a phosphinous acid group ($=POY$), Y being H or an alkali metal. Sodium (Na) is a preferred example of Y. Among these polar groups, those which are solely composed of or based on $=PO_3Na$ are preferred. The P-containing polar groups are preferably contained in an amount of 0.01–10 wt %, more preferably 0.02–3 wt %, in the molecule as calculated for P atom. The P-containing polar groups may be present in the backbone chain of the skeletal resin or in branched chains.

The skeletal resin that binds the P-containing polar groups together is an electron beam curable urethane resin. More specifically, it is a P-containing electron beam curable resin that has at least one acrylic double bond in the molecule and which has been subjected to reaction with at least one of the phosphorus compounds to be described below; to put in another way, the skeletal resin is a polyurethane acrylate resin that binds to an acrylic double bond containing compound via a urethane bond.

The term "acrylic double bond" as used herein means an acryloyl or methacryloyl group which is the residue of acrylic acid, an acrylate ester, acrylic acid amide, methacrylic acid, a methacrylate ester, methacrylic acid amide or the like.

Preferred examples of the acrylic double bond containing compound include: mono(meth)acrylates of glycols such as ethylene glycol, diethylene glycol and hexamethylene glycol; mono(meth)acrylates and di(meth)acrylates of triol compounds such as trimethylolpropane, glycerin and trimethylolethane; mono(meth)acrylates of tetrahydric and higher polyols such as pentaerythritol and dipentaerythritol; and hydroxy group containing acrylic compounds such as di(meth)acrylate, tri(meth)acrylate, glycerin monoallyl ether and glycerin diallyl ether.

The resin molecule should contain at least one, preferably 2–20, acrylic double bonds.

The polyurethane acrylate resin can generally be obtained by reacting a hydroxy group containing resin or a hydroxy group containing acrylic compound with a polyisocyanate containing compound.

Examples of the hydroxy containing resin include: polyalkylene glycols such as polyethylene glycol, polybutylene glycol and polypropylene glycol; alkylene oxide adducts of bisphenol A; and polyester polyols derived from various glycols and which have a hydroxyl group at a terminal end of the molecular chain.

A preferred polyurethane acrylate resin is one that is obtained using a polyester polyol as a component.

Examples of the carboxylic acid component of the polyester polyol include: aromatic dicarboxylic acids such as terephthalic acid, isophthalic acid, orthophthalic acid and 1,5-naphthalic acid; aromatic oxycarboxylic acids such as p-oxybenzoic acid and p-(hydroxyethoxy)benzoic acid; aliphatic dicarboxylic acids such as succinic acid, adipic acid, azelaic acid, sebacic acid and dodecanedicarboxylic acid; unsaturated aliphatic acids and alicyclic dicarboxylic acids such as fumaric acid, maleic acid, itaconic acid, tetrahydrophthalic acid and hexahydrophthalic acid; and tri- and tetracarboxylic acids such as trimellitic acid, trimesic acid and pyromellitic acid.

Examples of the glycol component of the polyester polyol include: ethylene oxide adducts and propylene oxide adducts of ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, bisphenol A and so forth; ethylene oxide and propylene oxide adducts of hydrogenated bisphenol A; polyethylene glycol, polypropylene glycol and polytetramethylene glycol, etc.

Tri- and tetraols such as trimethylolethane, trimethylolpropane, glycerin and pentaerythritol may also be used.

Other polyester polyols that can be used include lactone-based polyester diols that are obtained by ring opening polymerization of lactones such as caprolactone.

Examples of the polyisocyanate containing compound include: isocyanate compounds such as 2,4-tolylene diisocyanate, 2,6-tolylene diisocyanate, p-phenylene diisocyanate, biphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4,4'-biphenylene diisocyanate, 4,4'-diphenylene diisocyanate, 4,4'-diisocyanate-diphenyl ether, 1,5'-naphthalene diisocyanate, p-xylene diisocyanate, m-xylene diisocyanate, 1,3-diisocyanate methyl cyclohexane, 1,4-diisocyanate methyl cyclohexane, 4,4'-diisocyanate dicyclohexane, 4,4'-diisocyanate cyclohexylmethane and isophorone diisocyanate; and triisocyanate compounds such as a trimer in which no more than 7 mol % of all isocyanate groups present is occupied by 2,4-tolylene diisocyanate and a trimer in which no more than 7 mol % of all isocyanate groups present is occupied by hexamethylene diisocyanate.

Phosphorus compounds represented by the following general formulae (I)–(V) are preferably used in the manufacture of the polyurethane acrylate resin under consideration:

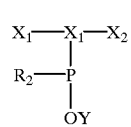
(I)

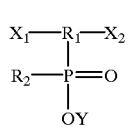
(II)

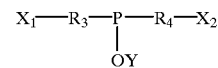
(III)

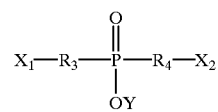
(IV)

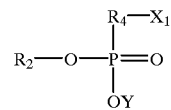
(V)

wherein $X_1$ and $X_2$ each represent an ester forming radical; $R_1$ is an octavalent hydrocarbyl group having 8–10 carbon atoms; $R_2$ is an alkyl group having 1–12 carbon atoms, a cycloalkyl group, an aryl group, an alkoxy group, a cycloalkoxy group or an aryl group, with the aryl and aryloxy groups optionally having a hydrogen atom, a hydroxy group, —OM' (M' is an alkali metal) or an amino group bound thereto; $R_3$ and $R_4$ each independently represent an alkylene group having 1–12 carbon atoms, a cycloalkylene group, an arylene group or a group represented by —$(CH_3OR_5)_m$— (provided that $R_5$ is an alkylene group having 1–12 carbon atoms, a cycloalkylene group or an arylene group; m is an integer of 1–4); Y is an alkali metal, hydrogen, a monovalent hydrocarbyl group or an amino group, preferably Na.

Specific and preferred examples of the phosphorus compounds (I)–(V) are described in Unexamined Published Japanese Patent Application (kokai) No. 131652/1994.

These phosphorus compounds can be introduced at various stages of the manufacture of the polyurethane acrylate resin. For example, they may be used as a component when preparing feed resins for polyester polyols and polyalkylene glycols. Particularly in the case of preparing polyester polyols, the phosphorus compounds may be subjected to reaction by adding them at any stage prior to the completion of polymerization for the preparation of the polyester polyols.

The phosphorus compounds may also be used as a component of the feed for the polyurethane acrylate resin. For example, a phosphorus compound containing a hydroxy group may be directly reacted with an isocyanate compound, a polyester polyol or an acrylate compound to prepare the polyurethane acrylate resin.

The electron beam curable urethane resin having a P-containing polar group which is to be used in the present invention may be obtained by known methods in which an acrylic double bond containing compound and a feed containing a specified phosphorus compound and/or a feed resin or the like that has been reacted with the specified phosphorus compound are reacted with each other in the presence or absence of a solvent. The thus obtained resin has desirably a molecular weight of 500–100,000. Detailed of these methods are found in Unexamined Published Japanese Patent Application (kokai) Nos. 43830/1987, 77134/1986, 40615/1987, 195720/1987 and so forth.

The electron beam curable urethane resin having a P-containing polar group is commercially available under various trade names such as "TB-0242" (Toyobo Co., Ltd.).

In order to ensure that the intended advantages of the present invention are fully attained, the electron beam curable vinyl chloride based resin having a S-containing polar group and the electron beam curable urethane resin having a P-containing polar group are preferably mixed such that the weight ratio of the former to the latter ranges from 69:31 to 10:90, more preferably from 60:40 to 40:60. In addition to these resins, various known resins may be contained in amounts not more than 20 wt % of all components of the non-magnetic layer.

In addition to the two electron beam curable resins, the non-magnetic layer also contains a non-magnetic powder, a conductive substance, a solvent, a lubricant, an abrasive and so forth.

Examples of the non-magnetic powder include the particles of carbon black, graphite, titanium oxide, barium sulfate, ZnS, $MgCO_2$, ZnO, CaO, γ-iron sulfide, W disulfide, Mo disulfide, boron nitride, MgO, $SnO_2$, $SiO_2$, $Cr_2O_3$, α-$Al_2O_3$, SiC, cerium oxide, corundum, synthetic diamond, α-iron oxide, garnet, silicon nitride, boron nitride, silicon carbide, molybdenum carbide, boron carbide, tungsten carbide, titanium carbide, tripoli, diatomaceous earth and dolomite.

The particles of these non-magnetic substances to be used in the non-magnetic layer may be spherical, granular, acicular and in any other shapes that are commonly used in the art. It should, however, be mentioned that acicular particles are preferred to spherical, granular and other shapes since they provide a higher degree of smoothness for superposed layers. Specifically, acicular non-magnetic particles have preferably an average length of 0.08–0.40 μm and an average aspect ratio of 3–10, with the respective ranges of 0.10–0.30 μm and 4–10 being more preferred. With excessive average lengths, the surface smoothness of the undercoat decreases and with unduly small average lengths, the intended advantage of using acicular particles is not obtained. Granular non-magnetic particles have preferably an average size of 0.02–0.05 μm.

The non-magnetic layer preferably contains conductive substances. Suitable conductive substances have an average particle size of 10–60 nm (preferably 15–40 nm), a specific surface area (BET method) of not more than 150 $m^2/g$ (preferably 20–150 $m^2/g$, more preferably 25–150 $m^2/g$ and most preferably 30–130 $m^2/g$) and a DBP absorption of not more than 100 mL/100 g (preferably 20–100 mL/g and more preferably 30–80 mL/100 g). There are no particular limitations on the kind and other factors of the conductive substances to be used as long as they satisfy the above requirements. If their average particle size is less than 10 nm, the dispersibility decreases to cause occasional deterioration in the surface property. Deterioration in the surface property may sometimes occur if the average particle size exceeds 60 nm. If the specific surface area exceeds 150 $m^2/g$, the particles become difficult to disperse and it also becomes difficult to prepare a highly filled-up coating mix. Similar problems tend to occur if the DBP absorption exceeds 100 mL/100 g. If the specific surface area or the DBP absorption is unduly small, the surface property tends to deteriorate.

The average particle size of the conductive substances may be determined by examination with a transmitting electron microscope (TEM).

Preferred conductive substances include carbon black, $SnO_2$, $TiO_2$, Sb doped $SnO_2$ and black conductive titanium oxide ($TiO_x$; $1 \leq x \leq 2$).

Among these, carbon black is desirable from the viewpoint of attaining satisfactory levels of surface property and conductivity and nonstructural carbon black with its structure having not fully developed is particularly desirable. The non-structural carbon black is comparatively low in conductivity but on the other hand it has so high a dispersibility that the ratio of filling-up of the pigment of the non-magnetic layer can be increased. As a result, the surface property of the non-magnetic layer per se and, hence, the surface of the magnetic layer is improved to enhance the advantages of the invention. The shape of the nonstructural carbon black is not limited in any particular way and may be spherical, flaky, lumpy, fibrous or otherwise, with spherical particles being particularly preferred.

The carbon black to be used in the invention is directly available on the market under various trade names such as #45B, MA8B, #52B and CF9B (all made by Mitsubishi Kasei Corp.) and RAVEN760 (made by Columbia Carbon).

The contents of carbon black and conductive substances may generally be determined by the desired characteristics and the types of the carbon black and conductive substances to be used. If they are to be used together with other non-magnetic powders, they are preferably added in amounts ranging from 5 to 50 wt %, with said other non-magnetic powders taken as 100 wt %. If carbon or conductive substances are added in the stated ranges, it is easy to control both the surface property and the conductivity.

The solvents to be used are not limited in any particular way, except that suitable solvents are selected in consideration of the solubility of a binder, compatibility with it and other factors. Examples of suitable solvents include: ketones such as acetone, methyl ethyl ketone, methyl isobutyl ketone and cyclohexanone; aromatic hydrocarbons such as toluene, xylene and ethylbenzene; esters such as ethyl formate, ethyl acetate and butyl acetate; alcohols such as methanol, ethanol, isopropanol and butanol; ethers such as isopropyl ether, ethyl ether and dioxane; furans such as tetrahydrofuran and furfural; diluents or solvents such as dimethylformamide and vinylpyrrolidone. These may be used either alone or in admixture. These solvents are preferably used in amounts of 10–10,000 wt %, more preferably 100–5,000 wt %, of binder.

While various lubricants are known, aliphatic acids and/or aliphatic acid esters are particularly preferred in the present invention.

Exemplary aliphatic acids are those having at least 8 carbon atoms (RCOOH; R is an alkyl group having at least 11 carbon atoms and they include caprylic acid, capric acid, lauric acid, myristic acid, palmitic acid, stearic acid, behenic acid, oleic acid, elaidic acid, linoleic acid, linolenic acid and stearolic acid. Among these, myristic acid, stearic acid, oleic acid, elaidic acid linoleic acid, linolenic acid and stearolic acid are preferred.

Preferred aliphatic acid esters are those which are made of saturated or unsaturated aliphatic acids having 10–22 carbon atoms and saturated or unsaturated alcohols having 4–22 carbon atoms or cyclic alcohols (e.g. sorbitan) or alcohols produced by reducing polysaccharides. Particularly preferred examples are butyl stearate, oleyl oleate, sorbitan monostearate and sorbitan tristearate. The aliphatic chains of the aliphatic acids and/or alcohols in the esters may be saturated or unsaturated and assume various forms including n- and i-forms.

Other lubricants that can be used include metal soaps made of alkali metal or alkaline earth metal salts of the aliphatic acids set forth above, as well as silicone oil, fluorinated oils, paraffin, liquid paraffin and surfactants.

The lubricants described above are preferably used in a total amount of not more than 20 wt %, more preferably 0.1–15 wt %, of the non-magnetic powder which is taken as 100 wt %.

Common inorganic compounds may be used as abrasives and preferred are those materials which have a Mohs hardness of at least 6 as exemplified by $Cr_2O_3$, $\alpha$-$Al_2O_3$ and SiC. It is preferred to use abrasives having a particle size of about 0.05–0.5 μm.

The present invention requires that the as-applied non-magnetic layer (undercoat) should have a glass transition temperature (Tg) of 30–53° C. before it is cured with electron beams. If this requirement is met, the uncured undercoat can be calendered with great ease. If this undercoat is combined with the magnetic layer (topcoat) which has a glass transition temperature (Tg) of at least 65° C. after curing, a magnetic recording medium that is flexible from low to high temperature can be obtained.

The glass transition temperature (Tg) of the undercoat need to lie within the stated range when it is measured in the as-applied state prior to curing with electron beams. Suitable adjustment can be made by mixing resins of varying glass transition temperatures (Tg) to be contained in the undercoat. Glass transition temperature (Tg) measurement can be done with a viscoelasticity spectrum meter.

One way to ensure that the as-applied non-magnetic layer has a glass transition temperature (Tg) of not more than 53° C. before curing with electron beams is by using resins of low Tg, particularly an EB curable urethane resin of low Tg. Changing the polyester portion of the polyurethane resin component is particularly preferred since Tg can be lowered without deteriorating the dispersibility. If the Tg of the non-magnetic layer before curing exceeds 53° C., it becomes difficult to calender the undercoat or the calenderability of the overlying magnetic layer will deteriorate. What is more, depending on the Tg of the as-applied topcoat (magnetic layer), the physical properties of the recording medium tend to deteriorate at low temperature. If the Tg of the as-applied non-magnetic layer is less than 30° C. before curing, there is no problem in calendering but, on the other hand, the physical properties of the recording medium tend to deteriorate no matter how high the Tg of the as-applied magnetic layer is. Other methods that may be employed to ensure that the Tg of the as-applied non-magnetic layer falls within the range of 30–53° C. before curing include the following: adjusting the proportions of the vinyl chloride based resin and the urethane resin; adjusting the resin proportion with respect to pigments such as the non-magnetic powder and conductive substance (as the resin proportion increases, Tg tends to decrease); and adding a monomer (the smaller the monomer's molecular weight, the lower the Tg). Any known monomers may be used in the last method and they include acrylate or methacrylate based polyfunctional monomers or oligomers that use trimethylolpropane, dipentaerythritol, pentaerythritol, neopentylglycol, etc. as the skeleton.

To cure the coating of the non-magnetic layer, electron beams are preferably applied in doses of 1–10 Mrad, more preferably 3–7 Mrad. Their irradiation energy (acceleration voltage) is preferably at least 100 kV.

The coating of the non-magnetic layer may be irradiated with electron beams at any time after a coating mix containing the above-described resins is applied to a non-magnetic base to form a coating. Curing the non-magnetic layer by applying electron beams after it is calendered is the most desirable because this makes it easy to provide good surface property for the undercoat. If necessary, electron beams may be applied before the non-magnetic layer is calendered or after the magnetic layer is applied and dried. Alternatively, electron beams may be applied both before and after the application of the magnetic layer.

The magnetic layer which forms the topcoat contains an iron (Fe) based magnetic powder and has a glass transition temperature (Tg) of not less than 65° C. after curing. The magnetic powder to be used in the present invention contains iron (Fe) as a main component, with the remainder preferably having the following composition relative to iron (Fe) which is taken as 100 wt %: 18–40 wt % Co; 1–15 wt % Al; and 1–15 at % Y or rare earth elements. The Co content of the Fe based magnetic powder is preferably 18–40 wt %. Below 18 wt %, there is no improvement in magnetic energy and above 40 wt %, it is difficult to ensure uniformity in the characteristics of the magnetic powder. In the absence of Al, the Fe based magnetic powder may sinter or its strength may decrease to deteriorate the keeping quality or the dispersibility and stability of the magnetic coating mix will be adversely affected. In the absence of Y or rare earth elements, the Fe based magnetic powder will likewise sinter and the resulting deformation may potentially cause deterioration in SFD (switching field distribution).

Other elements that may be contained in the Fe based magnetic powder include the following: Si, Cr, Mn, Ni, Zn, Cu, Zr, Ti, Bi, Ag, Pt, B, C, P, N, S, Sc, V, Mo, Rh, Pd, Sn, Sb, Te, Ba, Ca, Ta, W, Re, Au, Hg, Sr and Pb.

The Fe based magnetic particles may be pretreated in various ways such as covering them with the films of Al, Si, P or their oxides, treating their surfaces with a coupling agent such as Si, Al or Ti or various surfactants, or treating them prior to dispersing with a dispersant, a lubricant, a surfactant, an antistatic and so forth.

The Fe based magnetic powder may contain soluble inorganic ions such as those of Na, K and Ca and their concentrations are preferably 500 ppm or less, more preferably 100 ppm or less.

The water content of the Fe based magnetic powder may range from 0.1 to 2% and it is preferably optimized in accordance with the type of binder and other factors.

The pH of the Fe based magnetic powder is preferably optimized to the range of 7–11 by combining with a suitable binder, with the range of 8–10 being more preferred.

The Fe based magnetic powder has preferably a specific surface area of 25–70 $m^2/g$, more preferably 35–60 $m^2/g$, as measured by the BET method.

The Fe based magnetic powder has preferably a saturation magnetization of at least 130 emu/g, more preferably 140–170 emu/g. The length of the magnetic particles is preferably 0.2 μm or less, more preferably 0.05–0.15 μm. Their crystal size (Dx) is preferably 200 Å or less, more preferably 90–180 Å.

The Fe based magnetic particles may be dispersed in commonly known binders such as thermoplastic resins, thermosetting or reactive resins and radiation-sensitive modified resins. These resins may be used either alone or in suitable combinations that are selected as appropriate for the characteristics of the intended magnetic recording medium and the conditions for its production.

Preferred thermoplastic resins are those having a softening temperature of not higher than 150° C., an average molecular weight of 5,000–20,000 and a degree of polymerization ranging from about 100 to about 2,000.

The thermosetting resins, reactive resins and radiation-sensitive modified resins may have the same levels for average molecular weight and the degree of polymerization as set forth above and upon heating and/or irradiation with electron beams after application, drying and calendering, reactions such as condensation and addition will occur to increase the molecular weights to an infinite level.

Exemplary resins that may be used as binder are vinyl chloride based copolymers which are specifically exemplified by a vinyl chloride-vinyl acetate-vinyl alcohol copolymer, a vinyl chloride-vinyl alcohol copolymer, a vinyl chloride-vinyl alcohol-vinyl propionate copolymer, a vinyl chloride-vinyl acetatemaleic acid copolymer, a vinyl chloride-vinyl acetate-vinyl alcohol-maleic acid copolymer, and a vinyl chloride-vinyl acetate-OH terminated and branched alkyl copolymer.

Urethane compounds are other examples that may be used with preference. Exemplary urethane compounds are polyurethane elastomers, prepolymers and telomers. The use of polyurethane is particularly effective since it offers high wear resistance and good adhesion to bases such as a PET film. Various polyisocyanates may be used as a feed for the synthesis of polyurethane and they include 2,4-toluene diisocyanate, 2,6-toluene diisocyanate, 4,4'-diphenylmethane diisocyanate, hexamethylene diisocyanate, isophorone diisocyanate, 1,3- or 1,4-xylene diisocyanate, 1,5-naphthalene diisocyanate, m- or p-phenylene diisocyanate, 3,3-dimethyl-4,4-diphenylmethane diisocyanate, 3,3-dimethylbiphenylene diisocyanate, 4,4-biphenylene diisocyanate, dicyclohexyl-methane diisocyanate, Desmodur L and Desmodur N.

Also useful are polyurethane elastomers and prepolymers produced by polycondensation of various polyesters including linear saturated polyesters (as prepared by the polycondensation of polyhydric alcohols such as ethylene glycol, diethylene glycol, glycerin, trimethylolpropane, 1,4-butanediol, 1,6-hexanediol, pentaerythritol, sorbitol, neopentyl glycol and 1,4-cyclohexanedimethanol with saturated polybasic acids such as phthalic acid, isophthalic acid, terephthalic acid, succinic acid, adipic acid and sebacic acid), linear saturated polyethers (e.g., polyethylene glycol, polypropylene glycol and polytetramethylene glycol), caprolactam, hydroxyl-containing acrylate esters and hydroxyl-containing methacrylate esters.

Other resins that can be used include the following: saturated and unsaturated polyester resins: polyvinyl alcohol based resins such as polyvinyl alcohol resins, butyral resins, acetal resins and formal resins; epoxy based resins, phenoxy based resins, cellulose derivative, polyfunctional ester resins, polyether ester resins, polyvinylpyrrolidone resins and their derivatives (PVP olefin copolymers) and polyether resins; polyfunctional polyethers such as polycaprolactone; polyamide resins, polyimide resins, phenolic resins and spiroacetal resins; acrylic resins containing at least one hydroxyl group containing acrylic or methacrylic ester as a comopnent of polymerization; an acrylonitrile-butadiene copolymer elastomer, a polybutadiene elastomer, a chlorinated rubber, an acrylic rubber, an isoprene rubber and cyclization products thereof; and elastomers such as epoxy modified rubbers and internally plastic, saturated linear polyesters.

Exemplary thermosetting resins include polycondensable phenolic resins, epoxy resins, polyurethane curable resins, urea resins, butyral resins, polymal resins, melamine resins, alkyd resins, silicone resins, acrylic reactive resins, polyamide resins, epoxy-polyamide resins, saturated polyester resins and urea-formaldehyde resins.

Exemplary reactive resins include the following: mixtures of the aforementioned polycondensed resins and crosslinkers such as isocyanate compounds; mixtures of high-molecular weight polyester resins and isocyanate prepolymers; mixtures of methacrylate copolymers and diisocyanate prepolymers; mixtures of polyester polyols and polyisocyanates; and mixtures of low-molecular weight polyols, high-molecular weight polyols and triphenyl-methane triisocyanate. Other examples include: mixtures of vinyl based copolymer resins [e.g. vinyl chloride-vinyl acetate (optionally containing carboxylic acids), vinyl chloride-vinyl alcohol-vinyl acetate (optionally containing carboxylic acids), vinyl chloride-vinylidene chloride, vinyl chloride-acrylonitrile, vinyl butyral and vinyl formal] and crosslinkers; mixtures of cellulosic resins (e.g. nitrocellulose and cellulose acetobutyrate) and crosslinkers: and mixtures of synthetic rubbers (e.g. butadiene-acrylonitrile) and crosslinkers. These polymers may be used either alone or in admixture.

The copolymers set forth above preferably have a hydroxyl group at terminals and/or in side chains since they can be easily crosslinked with isocyanates or by exposure to radiations. If desired, they may also contain —COOY, —$SO_3Y$, —$OSO_3Y$, —$OPO_3Y$, —$PO_3Y$—, —$PO_2Y$, —$N^+R_3Cl^-$, —$NR_2$ (Y is H or an alkali metal; R is H, methyl or ethyl) and other acidic or basic polar groups at terminals or in side chains. The inclusion of these polar groups is advantageous for the purpose of providing improved dispersibility.

The copolymers may be crosslinked using isocyanate adducts as a curing agent and useful adducts are those of polyisocyanates such as 2,4-toluene diisocyanate, 2,6-toluene diisocyanate, 4,4-diphenylmethane diisocyanate and hexamethylene diisocyanate with polyols such as trimethylolpropane. Specific examples include Colonate L, HL and 3041 (all made by Nippon Polyurethane Industry Co., Ltd.), 24A-100 and TPI-100 (all made by Asahi Chemical Industry Co., Ltd.) and Desmodur L and N (all made by B.F. Goodrich). These adducts are used in amounts of 1–50 wt % of the polymers.

In order to cure the reactive or thermosetting resins, they may usually be heated in an oven at 50–80° C. for 6–100 hours.

The binder is preferably used in an amount of 10–100 parts by weight for 100 parts by weight of the Fe based magnetic powder. If the binder content is unduly small, the magnetic particles are bound so poorly that shedding occurs in prolonged run to increase the chance of clogging. On the other hand, if the binder content is excessive, the desired electromagnetic conversion characteristics are not attained. The exact binder content is preferably determined in consideration of the balance between electromagnetic conversion characteristics and physical properties in order to meet the performance specification required by the hardware.

An abrasive, carbon black and other additives are also incorporated in the magnetic layer and they are essentially the same as described in connection with the non-magnetic layer.

For various reasons such as smaller thickness loss, better applicability and easier supply of the lubricant from the non-magnetic layer, the magnetic layer is preferably as thin as possible ($\leq 1$ μm), with 0.2 μm or less being more preferred.

The present invention requires that the magnetic layer (topcoat) should have a glass transition temperature (Tg) of at least 65° C. after thermal curing. When the cured magnetic layer has Tg of 65° C. or more, a magnetic recording medium of high physical properties can be obtained by combining it with the non-magnetic layer which has Tg of not more than 53° C. before curing. On the other hand, if the cured magnetic layer has Tg of less than 65° C., the durability at high temperature and the keeping quality in a hot and humid atmosphere will decrease to undesired levels. From the viewpoint of the coating's flexibility, durability at low temperature and still characteristics at 0° C., the cured magnetic layer has preferably Tg of not more than 90° C. It should be noted that the Tg of the topcoat need meet the stated requirement when measured on the applied and thermally cured topcoat and it can be adjusted by mixing resins of varying glass transition temperatures (Tg) to be contained in the topcoat. As in the case of the undercoat, glass transition temperature (Tg) measurement can be made with a viscoelasticity spectrum meter.

In the present invention, a magnetic coating mix is preferably coated on the non-magnetic layer after it is applied to a base, dried, calendered and cured. The magnetic layer can be cured by various methods such as heating, irradiation with electron beams and otherwise depending on the kind of the binder used and other factors.

The non-magnetic and magnetic layers that are described above are provided on a non-magnetic base and various known films may be used as the base, such as those made of polyesters [e.g. polyethylene terephthalate (PET) and polyethylene naphthalate (PEN)], polyolefins, polyamides, polyimides, polyamideimides, polysulfone cellulose triacetate and polycarbonates. Preferred base materials are PET, PEN and aromatic polyamides. More preferred are composite films made by coextruding in multiple layers two or three kinds of PET or PEN, and aromatic polyamide films. These films have the advantage of providing a good balance between electromagnetic conversion characteristics, durability, friction characteristics, film strength and production rate.

The non-magnetic bases preferably contain fillers selected from inorganic compounds such as oxides and carbonates of Al, Ca, Si, Ti, etc. and organic compounds such as acrylic resin based fine powders. The surface property of the recording medium can be controlled to any desired degree by adjusting the amounts and sizes of these compounds and, as a result, it becomes possible to control the electromagnetic conversion characteristics, durability, friction characteristics and other properties of the recording medium.

The non-magnetic bases may be subjected to preliminary treatments such as corona discharge treatment, plasma discharge and/or polymerization, coating with a tackifier, dust removal and stress relief by heating and/or humidity control.

In order to achieve a further improvement in running stability and ensure more effective prevention of static buildup on the magnetic layer, a back coat may be provided on the non-magnetic base. The back coat preferably contains 30–80 wt % of carbon black. If the content of carbon black is unduly small, not only the antistatic effect but also the running stability tends to decrease. On the other hand, if the content of carbon black is excessive, the strength of the back coat decreases to increase the chance of deterioration in durability over prolonged running. Carbon black may be of any types that are commonly used in the art and it preferably has an average particle size of about 5–500 nm. Average particle size measurement is usually done by examination with a transmitting electron microscope.

Besides the carbon black, the backcoating may contain non-magnetic inorganic powders such as abrasives in order to provide enhanced mechanical strength. For details of the abrasives, see the description of the non-magnetic layer.

Other additives that may optionally be incorporated in the backcoating are dispersants such as surfactants and lubricants such as higher aliphatic acids, aliphatic acid esters and silicone oil.

The backcoating uses a binder, a crosslinker and a solvent that may be essentially the same as those used in the above-described non-magnetic and magnetic layers. Binders that are worth particular mention include vinyl chloride, polyurethane resins, nitrocellulose, epoxy resins and phenoxy resins. The binders are preferably contained in amounts of 15–200 parts by weight, more preferably 50–180 parts by weight, per 100 parts by weight of the solids content. If the binder content is excessive, the friction with the path where the medium travels in sliding contact becomes so great that the running stability deteriorates to increase the chance of the occurrence of troubles during running. Another problem that occurs is the blocking to the magnetic layer. If the binder content is unduly small, the strength of the back coat decreases to lower the durability over prolonged running.

The backcoating has a thickness (after calendering) of not more than 1.0 $\mu$m, preferably 0.1–1.0 $\mu$m, more preferably 0.2–0.8 $\mu$m. If the thickness of the backcoating is excessive, the friction with the path where the medium travels in sliding contact becomes so great that the running stability tends to decrease. If the backcoating is unduly thin, the surface property of the non-magnetic base becomes predominant to deteriorate the surface property of the backcoating. As a result, the surface roughness of the backcoating, when it is heat cured, is transferred to the surface of the magnetic layer to reduce the output in a high-frequency range, as well as the levels of S/N and C/N. Another problem with the unduly thin backcoating is the occurrence of its abrasion during the running of the medium.

In the present invention, the non-magnetic and magnetic layers may be provided on one or both sides of the base. A plurality of the magnetic layers may be provided on the base. Particularly in the case where the magnetic layer is provided on one side of the base, the backcoating is preferably provided on the opposite side. To lubricate and protect the magnetic layer, the latter may be overlaid with protective lubricating layers such as a film of lubricating agent, a plasma polymerized film and a diamond-like carbon film.

The magnetic recording medium of the present invention can be produced by a process comprising the steps of:

(I) coating at least one side of a non-magnetic base with a non-magnetic coating mix containing electron beam curable resins to form a coating;

(II) curing said coating with electron beams to form a non-magnetic layer; and (III) coating said non-magnetic layer with a magnetic coating mix containing an iron (Fe) based magnetic powder to form a magnetic layer.

In step (II), the coating is preferably calendered before curing with electron beams.

If desired, the process may include step (IV) of forming a backcoating.

Specific procedure of the process is described below. First, the non-magnetic base is coated with a non-magnetic coating mix. The thickness of the non-magnetic layer may be determined as appropriate for the surface roughness of the non-magnetic base and the characteristics required of the medium. The non-magnetic layer has generally a thickness of 0.5–3.0 $\mu$m. Preferably, the non-magnetic layer has a thickness of at least 0.8 $\mu$m in order to ensure the advantages of providing the non-magnetic layer. After the non-magnetic coating mix is applied, the coating is dried and preferably calendered before curing with electron beams. The non-magnetic layer is preferably calendered before curing since it is provided with a satisfactory surface even if said calendering is conducted at a temperature and that applies low pressure. On the other hand, the non-magnetic layer is preferably calendered before the magnetic coating mix is applied.

Calendering rolls may consist of epoxy, polyester, nylon, polyimide, polyamide, polyimideamide and otherwise heat-resistant plastic rolls (optionally impregnated with carbon, inorganic compounds of metals and others) as combined with metallic rolls (to make three- to seven-high rolls); alternatively, they may solely consist of metallic rolls. The calendering temperature is preferably at least 70° C., more preferably at least 80° C.; the linear pressure is preferably at least 200 kg/cm, more preferably at least 300 kg/cm; the linear speed ranges from 20 to 700 m/min.

Processing by calendering offers the following advantages.

(1) The as-applied magnetic layer acquires better surface property and less rigorous conditions will suffice to calender it to produce a medium having advantageous physical properties.

(2) If the non-magnetic layer is calendered before curing, the abrasive in the magnetic layer is less likely to be transferred into the non-magnetic layer. Therefore, given a magnetic layer having a thickness of not more than 1.0 $\mu$m, especially not more than 0.5 $\mu$m, the coating thickness agrees with the particle size of the currently most common abrasive of high performance (0.1–0.5 $\mu$m), making it easy to produce a medium of high polishing performance. In other words, compared with the case of overlying the uncalendered non-magnetic layer with a topcoat, fine abrasive particles need be used in a small quantity to produce a medium of comparable polishing performance and this contributes to improve the electromagnetic conversion characteristics.

(3) If the non-magnetic layer is first calendered, the overlying topcoat becomes less sensitive to the filler in the base, thus contributing to provide better electromagnetic conversion characteristics.

(4) The wear of the application nozzle used to apply the magnetic layer to form the topcoat can be reduced.

It should be mentioned that unless the non-magnetic layer is cured by irradiation with electron beams or some other method prior to the application of the magnetic layer, the non-magnetic layer is affected by the solvent for the magnetic layer, making it difficult to achieve smooth application of the magnetic layer to form the topcoat.

Electron beams are preferably applied at a dose of 1–10 Mrad, more preferably 3–10 Mrad. Doses below 1 Mrad are insufficient to stabilize the as-applied surface of the magnetic layer; doses higher than 10 Mrad give no appreciable differences in the physical properties of the medium.

Higher doses are preferred for smooth application of the magnetic layer and for producing a magnetic recording medium of good physical properties; on the other hand, lower doses are preferred for effective calendering of the magnetic layer. Hence, applying electron beams both before and after the application of the magnetic layer is preferred from the viewpoint of attaining a good balance between various requirements.

Thermosetting resins are conventionally used in the non-magnetic layer. To cure them, thermal reactive curing agents are required but they generally have so high Tg that it is difficult to calender the magnetic layer (topcoat) very effectively. This is not the case with the present invention in which electron beam curable resins are cured with electron beams and it is easy to attain a balance between the requirements for the smooth application and effective calendering of the magnetic layer.

From a practical viewpoint, the process starting with the application of the non-magnetic layer, going through its calendering and irradiation with electron beams and ending with wind-up is preferably performed in one step. Particularly in the case where the base thickness is 7 $\mu$m or less, the static buildup on the running web disrupts the smoothness of the wind-up operation and lowers the production rate. If electron beams are applied to the non-magnetic layer before it is wound up, the static buildup is reduced and efficient wind-up can be accomplished. For the same reason, the application of the magnetic layer, its calendering, irradiation with electron beams and wind-up are preferably accomplished in one step.

The EB cured non-magnetic layer is then overlaid with a magnetic layer by applying a magnetic coating mix.

After the application of the magnetic layer, drying, calendering, application of a backcoating, drying, and thermal curing are performed in accordance with the general procedure for the manufacture of magnetic recording media. It should be noted that multiple applications of electron beams are prohibited depending on the types of the binders incorporated in the magnetic layer and the backcoating.

Particularly in the case where the binder in the backcoating contains a nitrocellulosic resin, it may potentially catch fire upon irradiation with electron beams. To avoid this problem, irradiation with electron beam should be finished prior to the application of the backcoating. This also contributes to improve the adhesion of the backcoating to the base.

After the non-magnetic and magnetic layers are thusly formed, surface smoothing is optionally performed, preferably by calendering. Specific procedure and conditions for calendering are essentially the same as described in connection with the non-magnetic layer.

After calendering, the assembly of the non-magnetic layer, magnetic layer and backcoating may be thermally cured at 40–80° C. and/or irradiated with electron beams in order to accelerate the curing of the respective layers.

Subsequently, the assembly is slit to a specified tape form of pressed into a specified disk shape; thereafter, the magnetic surface and/or the backcoat surface is subjected to secondary processing consisting of polishing, cleaning and so forth, thereby producing the magnetic recording medium of the present invention.

The following examples are provided for the purpose of further illustrating the invention but are in no way to be taken as limiting.

EXAMPLES

The samples of magnetic recording medium prepared in the following examples were evaluated for their characteristics in accordance with the criteria set forth below.

[Dispersive Gloss]

Measurement was made at an incident angle of 60° using GLOSS METER GM-3M (Murakami Color Research Institute).

[Surface Roughness (center-line-average roughness: Ra)]

Using TALYSTEP System (Taylor Hobson), Ra measurement was made in accordance with JIS B0601. The instrument was operated under the following conditions: filter, 0.18–9 Hz; stylus, 0.1×2.5 $\mu$m; stylus pressure, 2 mg; tracing speed, 0.03 mm/sec; sampling length, 500 $\mu$m. The same method was used to measure the Rz (ten-point average roughness) of the base film.

[Electromagnetic Conversion Characteristics (C/N)]

Signal for 20.96 MHz (½ Tb) was measured with Matsushita DVC camera model NV-DJ1 and reproduced at 19.96 MHz to determine the ratio for the playback signal. The tape position was in MP mode and 0 dB was for a TDK DVC-ref tape.

[Running Durability]

Three units of Matsushita DVC camera model NV-DJ1 were installed in each of the following environments: 0° C.; 20° C.×60% r.h.; and 40° C.×80% r.h. Tapes for 60-min play were allowed to run for 100 hours in a repeated playback mode and the RF output from the running tapes was monitored to investigate the variation in RF output for each run, drop in output, clogging and the state of tape after 100 hours. When any trouble occurred, a note was taken of the environment, the situation and the numbers of the tapes trouble occurred. When the RF output dropped momentarily by more than 3 dB below the initial value and when it was not restored for more than 15 seconds, the situation was described as "clogging". When the initial value was restored within 15 seconds, the situation was described as "momentary clogging".

[Dropouts (DO)]

Color bar signals were recorded on each tape with Matsushita DVC camera model NV-DJ1. In a playback mode, dropouts 5 ps wide and 12 dB deep were measured for 30 minutes with a dropout counter VH03AZ (Shibasoku) and the number of dropouts per minute was determined.

[° C. Still]

A still test was performed with three units of Sharp DVC camera model VL-DC1 installed at 0° C. after the limitation on still time was cancelled. A note was taken of the average of the still times on the three units of the deck. The length of measurement was not more than 60 minutes.

[Yield of Acceptable Products]

Coating was applied to a width of 274 mm so that the tape length would be 10,000 m after slitting. After slitting to a width of 6.35 mm, all samples of the pancake were checked for any bulging, wrinkles and streaks. The acceptable pancake length was determined in accordance with the following criteria and its ratio to the total pancake length was expressed as a percentage.

Bulging: The state of the pancake was examined visually and rated NG (no good) for the entire length when an obvious bulge was found.

Wrinkles or Streaks: The magnetic layer in 10 m from the head of the pancake was examined visually and rated OK for the entire length when neither streaks nor wrinkles were found. When any single streak or wrinkle was found, an area extending 1,000 m from the defect was rated NG. Another 10-m area was examined visually and the same procedure was repeated to determine the acceptable pancake length.

Example 1

(Composition of non-magnetic layer)

| Pigment | | |
|---|---|---|
| α-iron oxide | KDK "T-50α"<br>Spindle-shaped α-iron oxide<br>Al/Si = 1.0/0.7<br>BET value: 49 m²/g<br>Adsorption of aliphatic acid:<br>86 mg/g<br>Soluble ion ≦ 5 ppm | 100.0 parts by weight |
| Resins | | |
| Vinyl chloride | TOYOBO "TB-0246"<br>Vinyl chloride-epoxy<br>containing monomer<br>copolymer [(EBCVC)(S)]<br>Average degree of polymerization: 310<br>Epoxy content: 3 wt %<br>S content from the use of<br>potassium persulfate: 0.6 wt %<br>Prepared by acrylic modification | 9.6 parts by weight |

-continued

| | | |
|---|---|---|
| | of MR110 of Nippon Zeon with<br>2-isocyanate ethyl methacrylate<br>(MOI).<br>Acryl content: 6 moles/1 mole | |
| Polyurethane | TOYOBO "TB-0242"<br>Hydroxy containing acrylic<br>compound-phosphorus acid<br>group containing phosphorus<br>compound-hydroxy containing<br>polyester polyol [(EBCU(P)]<br>Average molecular weight:<br>23,000<br>P content: 0.2 wt %<br>Acryl content: 8 moles/1 mole | 9.6 parts by weight |
| Dispersant | TOHO CHEMICAL "RE610"<br>Organophosphate compound | 3.0 parts by weight |
| Abrasive | SUMITOMO CHEMICAL<br>"HIT50"<br>α-Alumina<br>Average particle size: 0.22 μm | 8.0 parts by weight |
| Lubricants | NIPPON OIL & FATS<br>"NAA180"<br>Aliphatic acid | 1.0 part by weight |
| | NIKKO CHEMICALS<br>"NIKKOL BS"<br>Aliphatic acid ester | 1.0 part by weight |

NV (solids content) = 34%
Solvent ratio MEK/toluene/cyclohexanone = 2/2/1

All or part of the materials listed above were blended with a kneader, dispersed with a horizontal pin mill and finally adjusted in viscosity by means of a solvent.

(Composition of magnetic layer)

| Magnetic powder 1 | DOWA MINING "HB167"<br>Co/Al/Y = 30 wt %/<br>6.1 wt %/6.1 at %<br>(for 100 wt % Fe)<br>Hc = 2,375 Oe<br>σs = 143 emu/g<br>BET value: 51 m²/g<br>Length of particle: 0.10 μm<br>Crystalline size: 165 Å<br>pH = 9.4 | 100.0 parts by weight |
|---|---|---|
| Resins | | |
| Vinyl chloride | NIPPON ZEON "MR110"<br>Vinyl chloride (VC)<br>copolymer<br>VC/2HEMA/AGE/terminal<br>OSO₃K =<br>84.5/4.5/7.4/0.36 | 7.7 parts by weight |
| Polyurethane | TOYOBO "UR8200"<br>Polyester polyurethane<br>Containing SO₃Na group<br>Average molecular<br>weight = 20,000 | 7.7 parts by weight |
| Dispersant | TOHO CHEMICAL<br>"RE610"<br>Organophosphate<br>compound | 3.0 parts by weight |
| Lubricant | SUMITOMO CHEMICAL<br>"HIT80"<br>α-Alumina<br>Average particle size =<br>0.09 μm | 5.0 parts by weight |
| Carbon | MITSUBISHI CHEMICALS #10<br>Furnace carbon<br>Particle size: 84 nm<br>BET value: 28 m²/g<br>Oil absorption:<br>84 mL/100 g | 0.2 parts by weight |
| Lubricant | NIPPON OIL & FATS | 1.2 parts by weight |

-continued

| | | |
|---|---|---|
| | "NAA180"<br>Aliphatic acid<br>NIKKO CHEMICALS<br>"NIKKOL BS"<br>Aliphatic acid ester | 1.0 parts by weight |
| Curing agent | NIPPON POLY-<br>URETHANE "C-2030"<br>Tolylene diisocyanate/<br>butyl acetate | 3.1 parts by weight |

NV = 15%
Solvent ratio MEK/toluene/cyclohexanone = 1/1/2

All or part of the materials listed above were blended with a kneader, dispersed with a horizontal pin mill and finally adjusted in viscosity.
(Composition of backcoating)

| | | |
|---|---|---|
| Carbon | MITSUBISHI CHEMICALS<br>#3170B<br>Furnace black<br>Primary particle size: 25 nm<br>BET value: 180 m$^2$/g<br>Oil absorption: 114 mL/100 g | 100.0 parts by weight |
| | COLUMBIAN SEVER-<br>CURVE MT<br>Thermal carbon<br>Particle size: 350 nm<br>BET value: 7 m$^2$/g | 1.2 parts by weight |
| Abrasive | TODA KOGYO "TF100"<br>α-iron oxide<br>Average particle size: 0.2 μm | 0.8 parts by weight |
| Resins | | |
| Vinyl chloride | NISSHIN KAGAKU<br>"MPR-TA"<br>Vinyl chloride (VC) copolymer<br>(VC/vinyl acetate/vinyl alcohol)<br>Average degree of poly-<br>merization: 420 | 66.7 parts by weight |
| | NISSHIN KAGAKU<br>"MPR-ANO"<br>Vinyl chloride (VC) copolymer<br>(VC/vinyl acetate/vinyl alcohol)<br>Average degree of poly-<br>merization: 340<br>N atom content: 390 ppm | 20.0 parts by weight |
| Polyurethane | TOYOBO "TS9555"<br>Polyester polyurethane<br>Containing SO$_3$Na<br>Average molecular weight:<br>40,000 | 46.6 parts by weight |
| Curing agent | NIPPON POLYURETHANE<br>"C3041"<br>Adduct of trimethylolpropane<br>with 3 molecules of TDI | 20.0 parts by weight |

NV = 10%
Solvent ratio MEK/toluene/cyclohexanone = 2/2/1

All or part of the materials listed above were agitated with a high-speed disperser, dispersed with a vertical pin mill and finally adjusted in viscosity by means of a solvent.
(Coating step)

A 5.2-μm thick polyethylene terephthalate base (TEIJIN PEN film Q11: Ra, 7 nm; Rz, 100 nm; Young's modulus, 700/730 kg/mm$^2$) was reverse coated with the non-magnetic layer to give an as-calendered thickness of 1.4 μm. Following subsequent calendering, the non-magnetic layer was irradiated with electron beams at a dose of 3 Mrad. The cured non-magnetic layer had a surface roughness (Ra) of 3.0 nm. The undercoat had a glass transition temperature (Tg) of 45° C. before the irradiation with electron beams.

The thus formed non-magnetic layer was overlaid with the magnetic layer which was applied from a nozzle to give an as-calendered thickness of 0.13 μm. The applied magnetic layer was then oriented, dried, calendered and irradiated with electron beams at a dose of 4 Mrad. A backcoating was applied with a gravure cylinder to give a dry thickness of 0.5 μm and subsequently dried.

The thus prepared web of tape was heat cured at 60° C. for 48 h and slit to a width of 6.35 mm, thereby producing a DVC tape. The heat cured topcoat had a glass transition temperature (Tg) of 70° C.

Comparative Example 1

Tape was produced as in Example 1 except that the non-magnetic layer used the resin "TB-0246" (which is hereinafter sometimes referred to as "EBCVC(S)") but did not use "TB-0242" (hereinafter sometimes referred to as "EBCU(P)"). The heat cured topcoat had a glass transition temperature (Tg) of 70° C. and the undercoat had a glass transition temperature (Tg) of 70° C. before curing with electron beams.

Comparative Example 2

Tape was produced as in Example 1 except that the non-magnetic layer used the resin "TB-0242" [EBCU(P)] but did not use "TB-0246" [EBCVC(S)]. The heat cured topcoat had a glass transition temperature (Tg) of 70° C. and the undercoat had a glass transition temperature (Tg) of 20° C. before curing with electron beams.

Comparative Example 3

Tape was produced as in Example 1 except that the resins in the non-magnetic layer were changed to 9.6 parts by weight of EBCVC(COOH) and an equal amount of EBCU (COOH). The heat cured topcoat had a glass transition temperature (Tg) of 70° C. and the undercoat had a glass transition temperature (Tg) of 60° C. before curing with electron beams.
[EBCVC(COOH)]

Vinyl chloride-vinyl acetate-vinyl alcohol-maleic acid copolymer

Average degree of polymerization: 400

Content of COOH group: 1 wt %

Content of acrylic group: 10 moles/1 mole
[EBCU(COOH)]

Hydroxy containing acrylic compound-carboxy containing compound-hydroxy containing polyester polyol-diphenylmethane diisocyanate Average degree of polymerization: $2.5 \times 10^4$ Content of COOH group: 1 wt %

Content of acrylic group: 6 moles/1 mole

Comparative Example 4

Tape was produced as in Example 1 except that the weight ratio of vinyl chloride based resin to urethane resin in the non-magnetic layer was changed from 50:50 to 70:30. The heat cured topcoat had a glass transition temperature (Tg) of 70° C. and the undercoat had a glass transition temperature (Tg) of 55° C. before curing with electron beams.

Comparative Example 5

Tape was produced as in Example 1 except of the following two points: the polyester polyurethane "UR8200" in the magnetic layer was changed to a polyurethane resin with a molecular weight of $2.3 \times 10^4$ that was composed of an adipic acid derived polyester polyol and diphenylmethane diisocyanate; the weight ratio of vinyl chloride based resin to urethane resin in the non-magnetic layer was changed from 50:50 to 70:30. The heat cured topcoat had a glass transition temperature (Tg) of 60° C. and the undercoat had a glass transition temperature (Tg) of 45° C. before curing with electron beams.

Example 2

Tape was produced as in Example 1 except that the weight ratio of vinyl chloride based resin to urethane resin in the non-magnetic layer was changed from 50:50 to 60:40. The heat cured topcoat had a glass transition temperature (Tg) of 70° C. and the undercoat had a glass transition temperature (Tg) of 50° C. before curing with electron beams.

Example 3

Tape was produced as in Example 1 except that the weight ratio of MR110 to UR8200 in the magnetic layer was changed from 50:50 to 65:35. The heat cured topcoat had a glass transition temperature (Tg) of 75° C. and the undercoat had a glass transition temperature (Tg) of 45° C. before curing with electron beams.

Comparative Example 6

Tape was produced as in Example 1 except for the following two points: the non-magnetic layer used the resin "TB-0242" [EBCU(P)] but did not use "TB-0246" [EBCVC(S)]; and the weight ratio of MR110 to UR8200 in the magnetic layer was changed from 50:50 to 65:35. The heat cured topcoat had a glass transition temperature (Tg) of 75° C. and the undercoat had a glass transition temperature (Tg) of 20° C. before curing with electron beams.

Comparative Example 7

Tape was produced as in Example 1 except for the following two points: the non-magnetic layer used the resin "TB-0246" [EBCVC(S)] but did not use "TB-0242" [EBCU(P)]; and the polyester polyurethane "UR8200" in the magnetic layer was changed to a polyurethane resin with a molecular weight of $2.3 \times 10^4$ that was composed of an adipic acid derived polyester polyol and diphenylmethane diisocyanate. The heat cured topcoat had a glass transition temperature (Tg) of 50° C. and the undercoat had a glass transition temperature (Tg) of 70° C. before curing with electron beams.

Example 4

Tape was produced as in Example 1 except for the following two points: "UR8200" as the basic skeleton was replaced by urethane EBCU(P)II which was the same polyester polyurethane as "UR8200" except that the acryl content was 8 moles/1 mole and that the P content was 0.2 wt %; the weight ratio of EBCVC(S)/EBCU(P)/EBCU(P)II was adjusted to 20:60:20. The heat cured topcoat had a glass transition temperature (Tg) of 70° C. and the undercoat had a glass transition temperature (Tg) of 38° C. before curing with electron beams.

Example 5

Tape was produced as in Example 1 except that the pigment in the non-magnetic layer was changed to a mixture of α-iron oxide and carbon as specified below and that magnetic powder 1 in the magnetic layer was changed to magnetic powder 2 also specified below. The heat cured topcoat had a glass transition temperature (Tg) of 70° C. and the undercoat had a glass transition temperature (Tg) of 45° C. before curing with electron beams.

(Pigment in non-magnetic layer)

| Pigment | | |
|---|---|---|
| α-iron oxide | TODA KOGYO "DPN250BX" Acicular α-iron oxide Al/Si: 0.16/0.28 wt % BET value: 53 m$^2$/g pH: 6 Soluble Na content: 30–100 ppm Soluble Ca content: 2–10 ppm Bulk density: 0.7 g/mL Length of particle: 0.15 μm Breadth of particle: 0.03 μm | 80.0 parts by weight |
| Carbon | COLUMBIAN CARBON "R760" Furnace carbon Primary particle size: 30 nm BET value: 70 m$^2$/g Oil absorption: 48 mL/100 g | 20.0 parts by weight |

(Magnetic powder in magnetic layer)

| | | |
|---|---|---|
| Magnetic powder 2 | KDK #1171 Ca/Al/Si/Sm = 30 wt %/2.3 wt %/2.0 wt %/3.6 at % (for 100 wt % Fe) Hc = 2,267 Oe σs = 148 emu/g BET value: 54 m$^2$/g Length of particle: 0.10 μm Crystallite size: 171 Å | |

Example 6

Tape was produced as in Example 5 except that the applied non-magnetic layer was not calendered but immediately irradiated with electron beams prior to the application of the magnetic layer. The heat cured topcoat had a glass transition temperature (Tg) of 70° C. and the undercoat had a glass transition temperature (Tg) of 45° C. before curing with electron beams.

Comparative Example 8

Tape was produced as in Example 5 except that the P-containing polar group in EBCU(P) in the non-magnetic layer was changed to 0.2 wt % of SO$_3$Na group (the resin having this group is hereinafter referred to as "EBCU(S)"). The heat cured topcoat had a glass transition temperature (Tg) of 70° C. and the undercoat had a glass transition temperature (Tg) of 45° C. before curing with electron beams.

Comparative Example 9

The resins "EBCVC(S)" and "EBCU(P)" in the non-magnetic layer ised in Example 5 were changed to a thermosetting (TS) vinyl chloride copolymer TSVC(S) and a thermosetting (TS) polyurethane resin TSU(P), respectively. TSVC(S) was "MR110" of Nippon Zeon Co., Ltd. which, being not an electron beam cured resin, could be modified to EBCVC(S) by exposure of electron beams. TSU(P) was a urethane resin with a molecular weight of $2.3 \times 10^4$ that was composed of an adipic acid derived polyester polyol and diphenylmethane isocyanate and which had a phosphoric acid group content of 0.2 wt %; "C-3041" of Nippon Polyurethane Co., Ltd. was used as a crosslinker.

The applied non-magnetic layer was calendered and heat cured at 60° C. for 48 hours.

Subsequent steps were taken as in Example 5 to form the magnetic layer and the backcoating (but the magnetic layer was not irradiated with electron beams) and a DVC tape was prepared from the resulting web of tape. The heat cured topcoat had a glass transition temperature (Tg) of 70° C. and the undercoat had a glass transition temperature (Tg) of 50° C. before thermal curing.

Comparative Example 10

The non-magnetic and magnetic coating mixes were the same as those used in Comparative Example 9. The non-magnetic coating mix was first applied with a reverse coated to give an as-calendered thickness of 1.4 µm. While the undercoat was wet, the magnetic coating mix was applied from a nozzle to give an as-calendered thickness of 0.13 µm (wet-on-wet method). The topcoat was oriented, dried and calendered. Subsequent steps were taken as in Example 5 to prepare a tape. The heat cured topcoat had a glass transition temperature (Tg) of 70° C. and the undercoat had a glass transition temperature (Tg) of 50° C. before thermal curing.

Example 7

Tape was produced as in Example 5 except that the non-magnetic base was changed from "Q11" to TEIJIN PEN base "Q16" of the same thickness (Ra, 7 nm: Rz, 100 nm; Young's modulus, 600/1200 kg/mm$^2$). The heat cured topcoat had a glass transition temperature (Tg) of 70° C. and the undercoat had a glass transition temperature (Tg) of 45° C. before curing with electron beams.

Example 8

Tape was produced as in Example 5 except that the non-magnetic base was changed to TEIJIN PEN base "TQV18" of dual type of the same thickness (Ra, 3 nm; Rz, 30 nm; Young's modulus, 600/900 kg/mm$^2$). The heat cured topcoat had a glass transition temperature (Tg) of 70° C. and the undercoat had a glass transition temperature (Tg) of 45° C. before curing with electron beams.

Example 9

Tape was produced as in Example 5 except for the following two points: the non-magnetic base was changed to TEIJIN PEN base "TQV18" of dual type of the same thickness (Ra, 3 nm; Rz, 30 nm; Young's modulus, 600/900 kg/mm$^2$); the applied non-magnetic layer was not calendered but immediately irradiated with electron beams. The heat cured topcoat had a glass transition temperature (Tg) of 70° C. and the undercoat had a glass transition temperature (Tg) of 45° C. before curing with electron beams.

The results are shown in Tables 1–5, in which "α" as "non-magnetic pigment" in the column "Composition of Undercoat" means "α-iron oxide". "W/D" as "multilayer coating method" means a wet-on-dry method wherein the applied undercoat is dried before application of the topcoat and "W/W" means a wet-on-wet method.

TABLE 1

|  | Ex. 1 | Comp. Ex. 1 | Comp. Ex. 2 | Comp. Ex. 3 |
| --- | --- | --- | --- | --- |
| Tg of undercoat (Composition of undercoat) | 45° C. | 70° C. | 20° C. | 60° C. |
| Vinyl chloride based resin (I) | EBCVC(S) | EBCVC(S) | — | EBCVC(COOH) |
| Urethane resin (II) | EBCU(P) | — | EBCU(P) | EBCU(COOH) |
| (I)/(II) ratio | 50/50 | — | — | 50/50 |
| Non-magnetic pigment | α | α | α | α |
| Dispersive gloss of undercoat, % | 160 | 140 | 120 | 100 |
| Ra after calendering, nm | 3.0 | 5.7 | 4.0 | 5.2 |
| Mltilayer coating method | W/D | W/D | W/D | W/D |
| Tg of topcoat (Magnetic powder in topcoat) (For 100 wt % Fe) | 70° C. | 70° C. | 70° C. | 70° C. |
| Co, wt % | 30 | 30 | 30 | 30 |
| Al, wt % | 6.1 | 6.1 | 6.1 | 6.1 |
| Y or rare earth, at % | Y; 6.1 | Y; 6.1 | Y; 6.1 | Y; 6.1 |
| Thickness of topcoat, µm | 0.13 | 0.13 | 0.13 | 0.13 |
| C/N | +0.5 | −2.2 | −1.9 | −2.8 |
| Running durability | OK in all environments | 0° C. clogging occurred in two thirds of samples | 40° C. all samples were forced to stop running | 0° C. clogging occurred in one third of samples |
| DO | 13 | 25 | 20 | 17 |
| 0° C. Still | ≧60 min | 6 min | 30 min | 10 min |
| Yield of acceptable products | 95% | 90% | 92% | 91% |

TABLE 2

|  | Comp. Ex. 4 | Comp. Ex. 5 | Ex. 2 | Ex. 3 |
| --- | --- | --- | --- | --- |
| Tg of undercoat | 55° C. | 45° C. | 50° C. | 45° C. |
| (Composition of undercoat) | | | | |
| Vinyl chloride based resin (I) | EBCVC(S) | EBCVC(S) | EBCVC(S) | EBCVC(S) |
| Urethane resin (II) | EBCU(P) | EBCU(P) | EBCU(P) | EBCU(P) |
| (I)/(II) ratio | 70/30 | 50/50 | 60/40 | 50/50 |
| Non-magnetic pigment | α | α | α | α |
| Dispersive gloss of undercoat, % | 160 | 160 | 160 | 160 |
| Ra after calendering, nm | 3.7 | 3.0 | 3.2 | 3.2 |
| Mltilayer coating method | W/D | W/D | W/D | W/D |
| Tg of topcoat | 70° C. | 60° C. | 70° C. | 75° C. |
| (Magnetic powder in topcoat) | | | | |
| (For 100 wt % Fe) | | | | |
| Co, wt % | 30 | 30 | 30 | 30 |
| Al, wt % | 6.1 | 6.1 | 6.1 | 6.1 |
| Y or rare earth, at % | Y; 6.1 | Y; 6.1 | Y; 6.1 | Y; 6.1 |
| Thickness of topcoat, μm | 0.13 | 0.13 | 0.13 | 0.13 |
| C/N | −0.3 | −0.4 | +0.2 | +0.0 |
| Running durability | 0° C. momentary clogging occurred in two thirds of samples | 40° C. clogging occurred in one third of samples | OK in all environments | OK in all environments |
| DO | 30 | 25 | 15 | 20 |
| 0° C. Still | 30 min | 50 min | ≧60 min | ≧60 min |
| Yield of acceptable products | 93% | 95% | 96% | 95% |

TABLE 3

|  | Comp. Ex. 6 | Comp. Ex. 7 | Ex. 4 | Ex. 5 |
| --- | --- | --- | --- | --- |
| Tg of undercoat | 20° C. | 70° C. | 38° C. | 45° C. |
| (Composition of undercoat) | | | | |
| Vinyl chloride based resin (I) | — | EBCVC(S) | EBCVC(S) | EBCVC(S) |
| Urethane resin (II) | EBCU(P) | — | EBCU(P) + EBCU(P)II | EBCU(P) |
| (I)/(II) ratio | — | — | 20/80 | 50/50 |
| Non-magnetic pigment | α | α | α | α/carbon |
| Dispersive gloss of undercoat, % | 120 | 140 | 163 | 145 |
| Ra after calendering, nm | 4.0 | 5.7 | 3.3 | 3.2 |
| Mltilayer coating method | W/D | W/D | W/D | W/D |
| Tg of topcoat | 75° C. | 50° C. | 70° C. | 70° C. |
| (Magnetic powder in topcoat) | | | | |
| (For 100 wt % Fe) | | | | |
| Co, wt % | 30 | 30 | 30 | 30 |
| Al, wt % | 6.1 | 6.1 | 6.1 | 2.3 |
| Y or rare earth, at % | Y; 6.1 | Y; 6.1 | Y; 6.1 | Sm; 3.6 |
| Thickness of topcoat, μm | 0.13 | 0.13 | 0.13 | 0.13 |
| C/N | −1.5 | −1.7 | +0.1 | +0.1 |
| Running durability | 40° C. two thirds of samples were forced to stop running | 0° C. clogging occurred in one third of samples | OK in all environments | OK in all environments |
| DO | 18 | 28 | 14 | 5 |
| 0° C. Still | 40 min | 15 min | ≧60 min | ≧60 min |
| Yield of acceptable products | 93% | 91% | 91% | 98% |

TABLE 4

|  | Ex. 6 | Comp. Ex. 8 | Comp. Ex. 9 | Comp. Ex. 10 |
|---|---|---|---|---|
| Tg of undercoat (Composition of undercoat) | 45° C. | 45° C. | 50° C. | 50° C. |
| Vinyl chloride based resin (I) | EBCVC(S) | EBCVC(S) | TSVC(S) | TSVC(S) |
| Urethane resin (II) | EBCU(P) | EBCU(S) | TSU(P) | TSU(P) |
| (I)/(II) ratio | 50/50 | 50/50 | 50/50 | 50/50 |
| Non-magnetic pigment | α/carbon | α/carbon | α/carbon | α/carbon |
| Dispersive gloss of undercoat, % | 145 | 120 | 142 | 142 |
| Ra after calendering, nm | (8.6) | 4.3 | 3.2 | — |
| Mltilayer coating method | W/D | W/D | W/D | W/W |
| Tg of topcoat (Magnetic powder in topcoat) (For 100 wt % Fe) | 70° C. | 70° C. | 70° C. | 70° C. |
| Co, wt % | 30 | 30 | 30 | 30 |
| Al, wt % | 2.3 | 2.3 | 2.3 | 2.3 |
| Y or rare earth, at % | Sm; 3.6 | Sm; 3.6 | Sm; 3.6 | Sm; 3.6 |
| Thickness of topcoat, μm | 0.13 | 0.13 | 0.13 | 0.13 |
| C/N | −0.2 | −1.2 | −0.7 | −1.0 |
| Running durability | 40° C. one third of samples were damaged | OK in all environments | OK in all environments | 0° C., 40° C. clogging occurred in one third of samples |
| DO | 4 | 5 | 6 | 5 |
| 0° C. Still | 45 min | 60 min | 45 min | 15 min |
| Yield of acceptable products | 98% | 93% | 60% | 65% |

TABLE 5

|  | Ex. 7 | Ex. 8 | Ex. 9 |
|---|---|---|---|
| Tg of undercoat (Composition of undercoat) | 45° C. | 45° C. | 45° C. |
| Vinyl chloride based resin (I) | EBCVC(S) | EBCVC(S) | EBCVC(S) |
| Urethane resin (II) | EBCU(P) | EBCU(P) | EBCU(P) |
| (I)/(II) ratio | 50/50 | 50/50 | 50/50 |
| Non-magnetic pigment | α/carbon | α/carbon | α/carbon |
| Dispersive gloss of undercoat, % | 145 | 145 | 145 |
| Ra after calendering, nm | 3.3 | 2.8 | (7.9) |
| Mltilayer coating method | W/D | W/D | W/D |
| Tg of topcoat (Magnetic powder in topcoat) (For 100 wt % Fe) | 70° C. | 70° C. | 70° C. |
| Co, wt % | 30 | 30 | 30 |
| Al, wt % | 2.3 | 2.3 | 2.3 |
| Y or rare earth, at % | Sm; 3.6 | Sm; 3.6 | Sm; 3.6 |
| Thickness of topcoat, μm | 0.13 | 0.13 | 0.13 |
| C/N | +0.2 | +0.4 | 0 |
| Running durability | OK in all environments | OK in all environments | 40° C. two thirds of samples were damaged |
| DO | 3 | 5 | 7 |
| 0° C. Still | ≧60 min | ≧60 min | 30 min |
| Yield of acceptable products | 98% | 82% | 85% |

As described above in detail, the present invention provides a magnetic recording medium that has high C/N in the high-frequency range required for digital recording, that will not clog in any environment, that causes only a few dropouts (DO) and that can be manufactured at high production rate. In particular, the combination of the specified polar groups in the resins to be used in the non-magnetic layer allows the pigment carbon to be dispersed effectively enough to provide a medium that has good electoromagnetic conversion characteristics with fewer DO.

As a further advantage, the non-magnetic layer made from the combination of the specified resins has good enough calenderability to acquire a smooth surface. Therefore, even with a single-layer base that has poor surface properties (Ra=7 nm; Rz≧100 nm), high electromagnetic conversion characteristics can be maintained and one can offer a magnetic recording medium that does not experience lower yields from any troubles that could be occurred during the run of the base and which can be manufactured at low cost and at high production rate.

What is claimed is:

1. A magnetic recording medium comprising a non-magnetic base having on at least one side a non-magnetic layer (undercoat) containing electron beam-curable resins which in turn is over-laid with a magnetic layer (topcoat) containing an iron (Fe) based magnetic powder, said magnetic layer having a glass transition temperature (Tg) of at least 65° C. and said non-magnetic layer being an electron beam cured coating that is formed by coating the non-magnetic base with a non-magnetic coating mix containing electron beam curable resins, the yet to be cured coating having a glass transition temperature (Tg) of 30–53° C. and said electron beam curable resins comprising an electron beam curable vinyl chloride based resin having a sulfur-containing polar group and an electron beam curable urethane resin having a phosphorus-containing polar group.

2. The magnetic recording medium according to claim 1, wherein the electron beam curable vinyl chloride based resin having a sulfur-containing polar group and the electron beam curable urethane resin having a phosphorus-containing polar group are present in a weight ratio of 69:31 to 10:90.

3. The magnetic recording medium according to claim 1, wherein the electron beam curable vinyl chloride based resin having a sulfur-containing polar group and the electron beam curable urethane resin having a phosphorus-containing polar group are present in a weight ratio of 60:40 to 40:60.

4. The magnetic recording medium according to claim 1 which has a backcoating provided on the other side of the non-magnetic base.

5. A process for producing the magnetic recording medium of claim 1 comprising the steps of:
   (I) coating at least one side of a non-magnetic base with a non-magnetic coating mix containing electron beam curable resins to form a coating;
   (II) curing said coating with electron beams to form a non-magnetic layer; and
   (III) coating said non-magnetic layer with a magnetic coating mix containing an iron (Fe) based magnetic powder to form a magnetic layer.

6. The process according to claim 5, wherein the coating is calendered before curing with electron beams in said step (II).

7. The process according to claim 5 which further includes step (IV) of forming a backcoating.

* * * * *